(12) United States Patent
Lim et al.

(10) Patent No.: US 11,966,109 B2
(45) Date of Patent: Apr. 23, 2024

(54) HOLE DISPLAY AND ELECTRONIC DEVICE COMPRISING SAME

(71) Applicant: Samsung Electronics Co., Ltd., Suwon-si (KR)

(72) Inventors: Silkyu Lim, Suwon-si (KR); Dongpil Choi, Suwon-si (KR); Hyunchang Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 17/508,527

(22) Filed: Oct. 22, 2021

(65) Prior Publication Data

US 2022/0075225 A1 Mar. 10, 2022

Related U.S. Application Data

(63) Continuation of application No. PCT/KR2020/005361, filed on Apr. 23, 2020.

(30) Foreign Application Priority Data

Apr. 23, 2019 (KR) .......................... 10-2019-0047463

(51) Int. Cl.
  *G02F 1/1333* (2006.01)
  *G02F 1/1335* (2006.01)

(52) U.S. Cl.
  CPC .. *G02F 1/133317* (2021.01); *G02F 1/133331* (2021.01); *G02F 1/133528* (2013.01)

(58) Field of Classification Search
  CPC ......... G02F 1/133317; G02F 1/133331; G02F 1/133528; G02F 1/133512; G02F 1/133615; G02B 5/30; H04M 1/02; H04M 1/0266
  See application file for complete search history.

(56) References Cited

U.S. PATENT DOCUMENTS

| 10,534,221 B1 | 1/2020 | Zhu |
| 2017/0059771 A1 | 3/2017 | Yuki et al. |

(Continued)

FOREIGN PATENT DOCUMENTS

| CN | 108594524 A | 9/2018 |
| CN | 207853957 U | 9/2018 |

(Continued)

OTHER PUBLICATIONS

Machine translation of CN 108594524 A (Year: 2018).*

(Continued)

*Primary Examiner* — Anne M Hines
*Assistant Examiner* — Jose M Diaz

(57) ABSTRACT

An electronic device may comprise a housing; an optical input/output device disposed inside the housing; an inner housing comprising a seating surface disposed inside the housing and including a hole to accommodate the optical input/output device, and a side wall protruding from the seating surface along the hole; a backlight module disposed on the seating surface and made of multiple layers, the backlight module comprising a first opening surrounding the side wall; a display panel disposed on the backlight module, the display panel comprising a first area corresponding to the hole area and a second area which surrounds the first area, and in which an active area is positioned; and a transparent plate disposed on the display panel. The side wall may comprise a first side surface facing the backlight module and may be black-processed.

20 Claims, 12 Drawing Sheets

(56) References Cited

U.S. PATENT DOCUMENTS

| | | |
|---|---|---|
| 2017/0153486 A1 | 6/2017 | Ahn et al. |
| 2017/0287992 A1 | 10/2017 | Kwak et al. |
| 2019/0072822 A1 | 3/2019 | Yasunaga et al. |
| 2019/0331960 A1 | 10/2019 | Li et al. |

FOREIGN PATENT DOCUMENTS

| | | |
|---|---|---|
| CN | 109459880 A | 3/2019 |
| KR | 10-1340042 B1 | 12/2013 |
| KR | 10-1717655 B1 | 3/2017 |
| KR | 10-2017-0111827 A | 10/2017 |

OTHER PUBLICATIONS

International Search Report and Written Opinion of the International Searching Authority dated Aug. 14, 2020, in connection with International Application No. PCT/KR2020/005361, 12 pages.
Notice of Preliminary Rejection dated Jul. 10, 2023, in connection with Korean Application No. KR10-2019-0047463, 13 pages.
Notice of Patent Grant dated Jan. 15, 2024, in connection with Korean Patent Application No. KR10-2019-0047463, 4 pages.

\* cited by examiner

HOLE DISPLAY AND ELECTRONIC DEVICE COMPRISING SAME

CROSS-REFERENCE TO RELATED APPLICATIONS

This application is a continuation of and claims priority to International Application No. PCT/KR2020/005361, filed Apr. 23, 2020, which claims priority to Korean Patent Application No. 10-2019-0047463, filed Apr. 23, 2019, the disclosures of which are herein incorporated by reference in their entirety.

BACKGROUND

1. Field

Various embodiments relate to a hole display and an electronic device including the same.

2. Description of Related Art

In addition to functions provided to users, the exterior design, visually-recognized material, and the like of electronic devices may be important factors in connection with users' selection of electronic devices.

In order to use the entire front surface of an electronic device as a display, the thickness of the bezel formed along the edge of the display may be reduced. In order to form a thin bezel, sensors disposed on the front surface of the electronic device may be disposed beneath the display. The decrease in width of the bezel may be proportional to the area in which sensors on the front surface of the electronic device are disposed.

SUMMARY

A backlight unit may include an opening corresponding to a sensor for a path of light emitted from the sensor or received by the sensor. Light reflected by a side wall of a metal material, which is formed along the edge of the opening, may be recognized by the user from the outside through a window of the electronic device (hole light leakage). As a result of the hole light leakage, the brightness of an area between the active area of the display and the black matrix of the hole may be higher or lower than the periphery.

There is a need for a scheme for reducing the hole light leak occurring in a hole display having a sensor disposed beneath the display.

An electronic device according to various embodiments may include a housing, an optical input/output device disposed in the housing, an inner housing disposed in the housing and including a seating surface that includes a hole to accommodate the optical input/output device, and a side wall protruding from the seating surface along the hole, a backlight disposed on the seating surface, formed of multiple layers, and including a first opening surrounding the side wall, a display panel disposed on the backlight module and including a first area corresponding to the hole area and a second area surrounding the first area, and a transparent plate disposed on the display panel, wherein the side wall includes a first side surface facing the backlight and is black-processed.

An electronic device according to various embodiments may improve a hole light leak occurring in a hole display.

An electronic device according to various embodiments may maintain the uniformity of brightness between the active area of a hole display and a hole black matrix.

DETAILED DESCRIPTION

Figure 1:
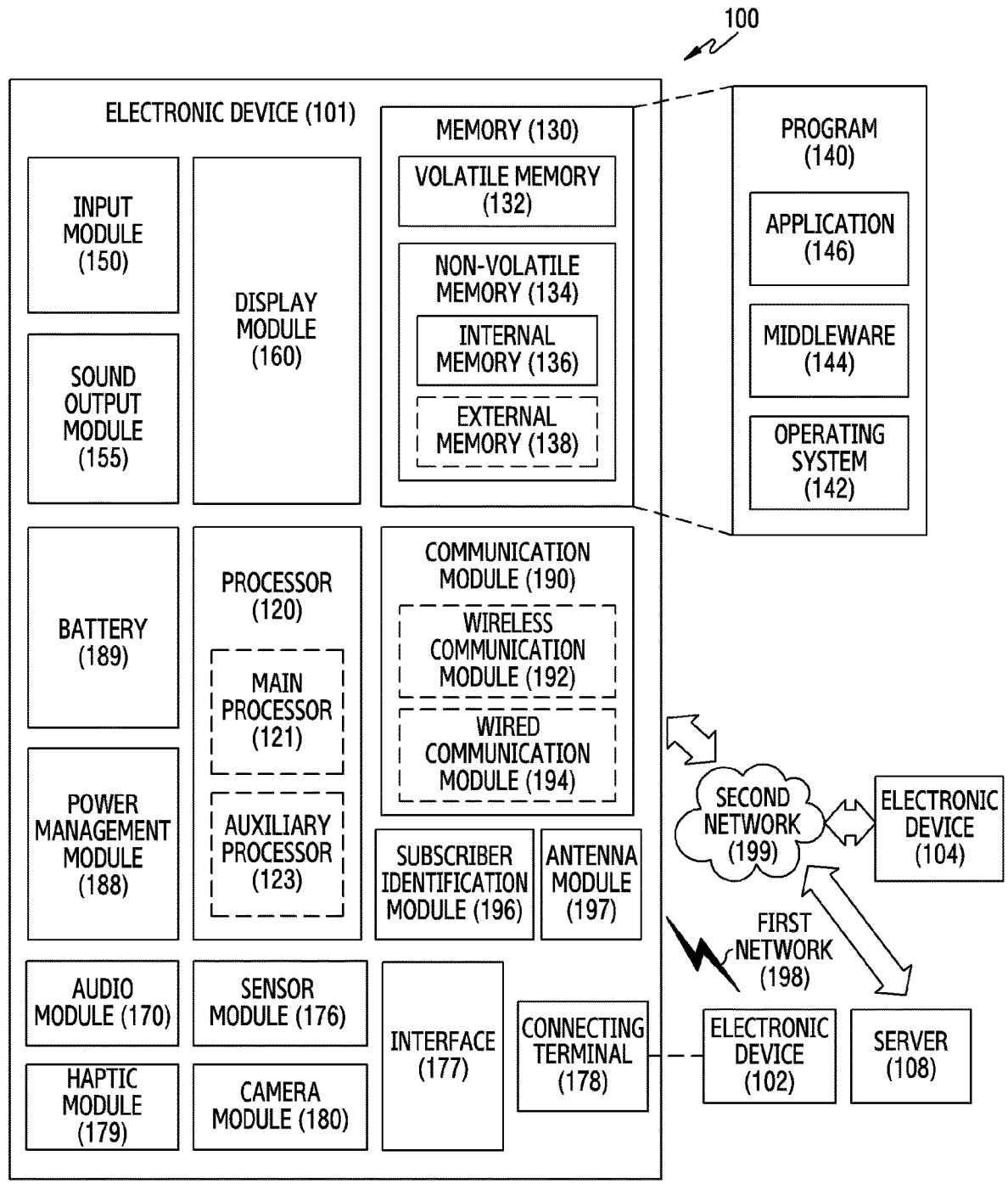
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
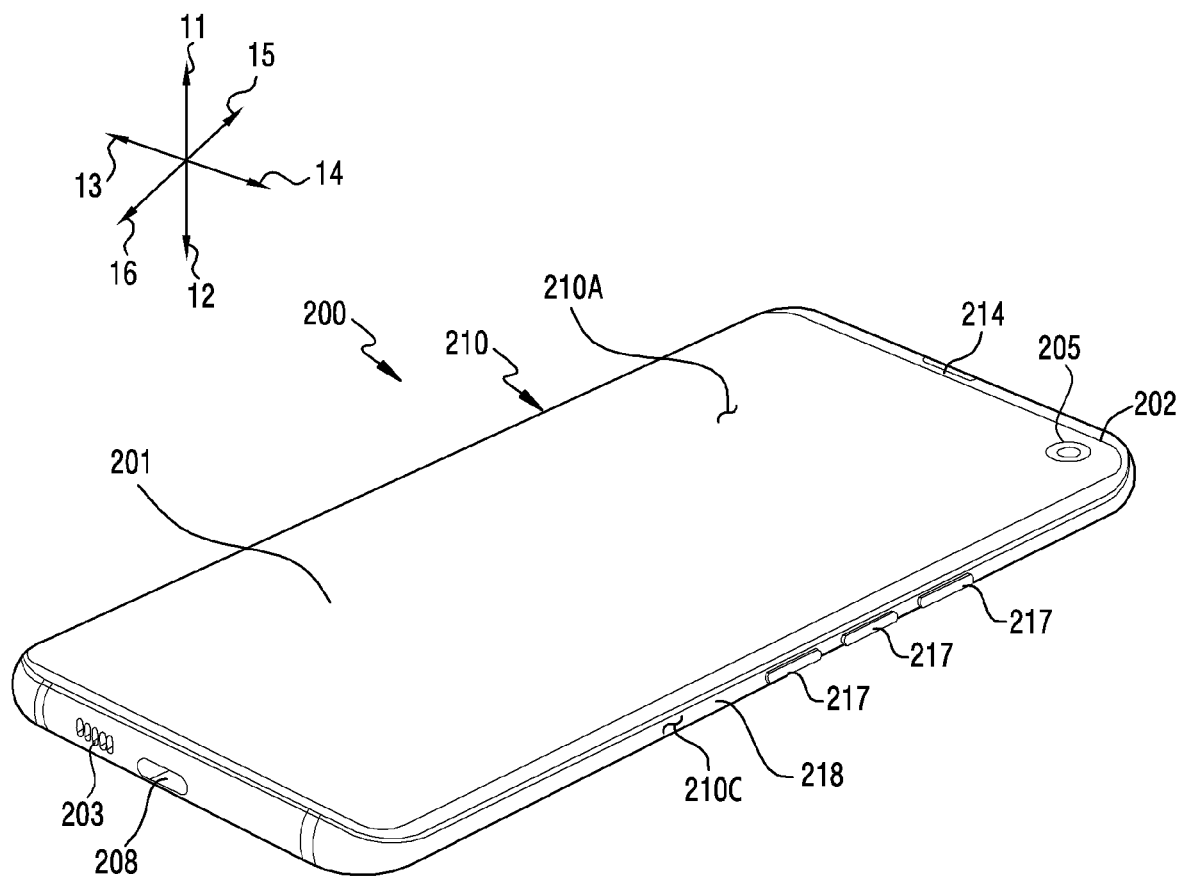
FIG. 2 is a perspective view illustrating an electronic device according to one of various embodiments disclosed herein.
Figure 3:
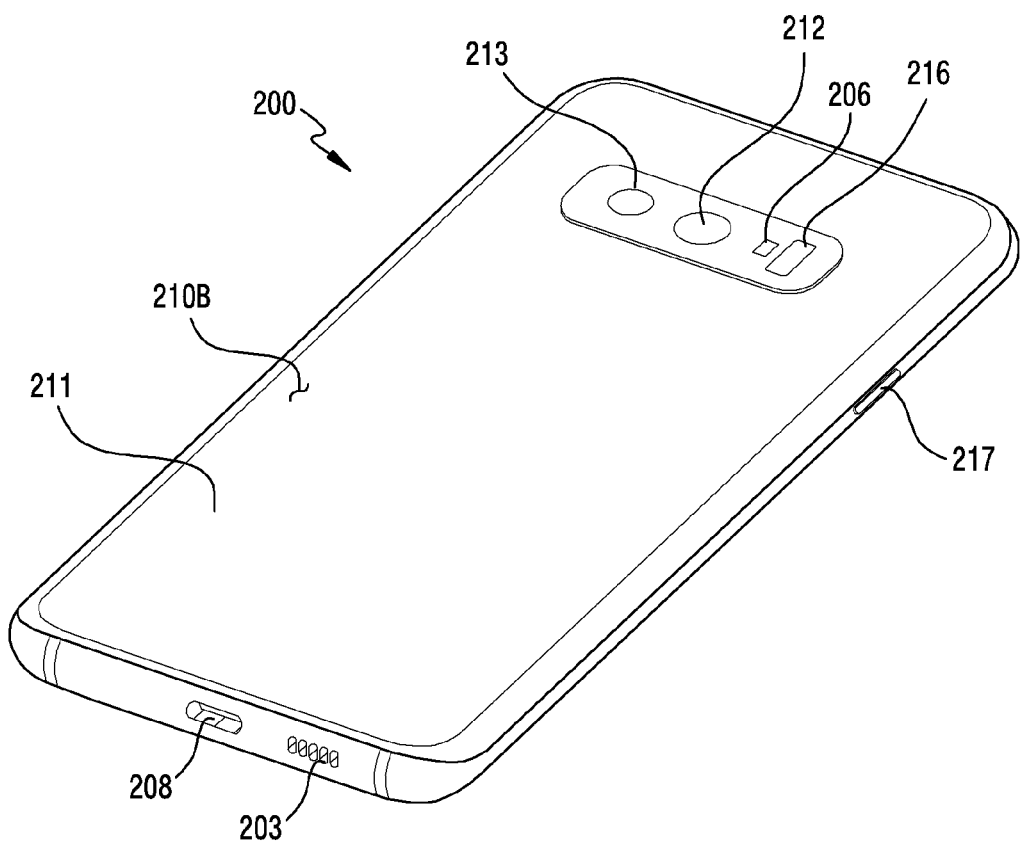
FIG. 3 is a perspective view illustrating the electronic device of FIG. 2 viewed from a rear side.

FIG. 2 is a perspective view illustrating an electronic device 200 according to one of various embodiments disclosed herein. FIG. 3 is a perspective view illustrating the electronic device 200 of FIG. 2 viewed from a rear side.

Referring to FIG. 2 and FIG. 3, the electronic device 200 according to various embodiments may include a housing 210 including: a first surface 210A (or a front surface); a second surface 210B (or a rear surface); and a side surface 210C (or a side wall) surrounding a space between the first surface 210A and the second surface 210B. According to various embodiments (not illustrated), the housing may refer to a structure which forms a portion of the first surface 210A, the second surface 210B, and the side surface 210C in FIG. 2 and FIG. 3.

According to various embodiments, at least a part of the first surface 210A is formed by a substantially transparent front plate 202 (e.g., polymer plate or glass plate including various coating layers). According to an embodiment, the front plate 202 may include a curved surface part seamlessly extending from the first surface 210A and curved toward a rear plate 211 at at least one side edge portion thereof.

According to various embodiments, the second surface 210B may be formed by the substantially transparent rear plate 211. The rear plate 211 may be formed by, for example, a coated or colored glass, a polymer, a metal (e.g., aluminum, stainless steel (STS), or magnesium), or a combination of at least two thereof. According to an embodiment, the rear plate 211 may include a curved surface part seamlessly extending from the second surface 210B and curved toward a front plate 202 at at least one side edge portion thereof.

According to various embodiments, the side surface 210C may be formed by a side bezel structure 218 (or "a side surface member or a side wall") that is coupled to the front plate 202 and the rear plate 211 and includes a metal and/or a polymer. According to one embodiment, the rear plate 211 and the side bezel structure 218 may be integrally formed and include the same material (e.g., metal material such as aluminum).

According to various embodiments, the electronic device 200 may include at least one of a display 201, audio modules 203 and 214, a sensor module, a camera module 205, a key input device 217, and a connector hole 208. According to one embodiment, at least one element (e.g., the key input device 217) may be omitted from the electronic device 200 or another element may be further added to the electronic device 200. For example, the electronic device 200 may include a sensor module which is not shown. For example, a sensor such as a proximity sensor or an illuminance sensor may be integrated with the display 201 or disposed to be adjacent to the display 201 in an area provided by the front plate 202. In one embodiment, the electronic device 200 may further include a light-emitting element, and the light-emitting element may be disposed to be adjacent to the display 201 in an area provided by the front plate 202. The light emitting element may provide, for example, a state information of the electronic device 200 in an optical form. According to another embodiment, the light emitting element may provide, for example, a light source linked to an operation of the camera module 205. The light-emitting device may include, for example, an LED, an IR LED, and a xenon lamp.

The display 201 may be exposed through a substantial portion of the front plate 202. In one embodiments, the edge of the display may be formed to have substantially the same outer shape (e.g., curved surface) adjacent to the front plate 202. In another embodiment (not illustrated), in order to extend the area in which the display 201 is exposed, a gap between an outer edge of the display 201 and an outer edge of the front plate 202 may be substantially constant. In another embodiment (not illustrated), a recess or an opening may be formed in a portion of a screen display area of the display 201, and an electronic component aligned with the recess or the opening, such as a camera module 205, a proximity sensor (not illustrated), or an illuminance sensor (not illustrated) may be included.

In another embodiment (not illustrated), a rear surface of the screen display area of the display 201 may include at least one of a camera module 212 and 213, a fingerprint sensor 216, and a second surface 210B. In another embodiment (not illustrated), the display 201 may be coupled or disposed to be adjacent to a touch sensing circuit, a pressure sensor capable of measuring the intensity (pressure) of a touch, and/or a digitizer detecting a magnetic field-type stylus pen.

The audio modules 203 and 214 may include a microphone hole and a speaker hole. The microphone hole may have a microphone disposed therein to acquire an external sound, and, in one embodiment, a plurality of microphones may be disposed therein to detect the direction of sound. In one embodiment, the speaker hole and the microphone hole may be implemented as one hole, or a speaker without a speaker hole may be included (e.g., piezo speaker).

The electronic device 200 includes the sensor module which is not shown, and thus can generate an electrical signal and data value corresponding to an internal operation state or an external environment state. The sensor module may further include, for example, a proximity sensor disposed at the first surface 210A of the housing 210, a fingerprint sensor integrated with or disposed to be adjacent to the display 201, and/or a biometric sensor (e.g., HRM sensor) disposed at the second surface 210B of the housing 210. The electronic device 200 may further include a sensor module which is not shown, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

The camera module 205, 212, 213, and 206 may include a first camera device 205 disposed at the first surface 210A of the electronic device 200, a second camera device 212 and 213 disposed at the second surface 210B, and/or the second surface 210B. the camera devices 205, 212, and 213 may include one or more lenses, an image sensor, and/or an image signal processor. The flash 206 may include, for example, a light-emitting diode or a xenon lamp. In one embodiment, two or more lenses (infrared camera, and wide-angle and telephoto lenses) and image sensors may be arranged in one surface of the electronic device 200.

The key input device 217 may be disposed at the side surface 210C of the housing 210. In another embodiment, the electronic device 200 may not include some or all of the above-mentioned key input device 217, and the key input devices 217 which is not included may be implemented in other forms, such as a soft key, on the display 201. In another embodiment, the key input device may include at least part of the fingerprint sensor 216 disposed at the second surface 210B of the housing 210.

The connector hole 208 may accommodate a connector for transmitting and receiving power and/or data to and from an external electronic device, and/or a connector for transmitting and receiving an audio signal to and from an external electronic device. For example, the connector hole 208 may include a USB connector or an earphone jack.

Figure 4:
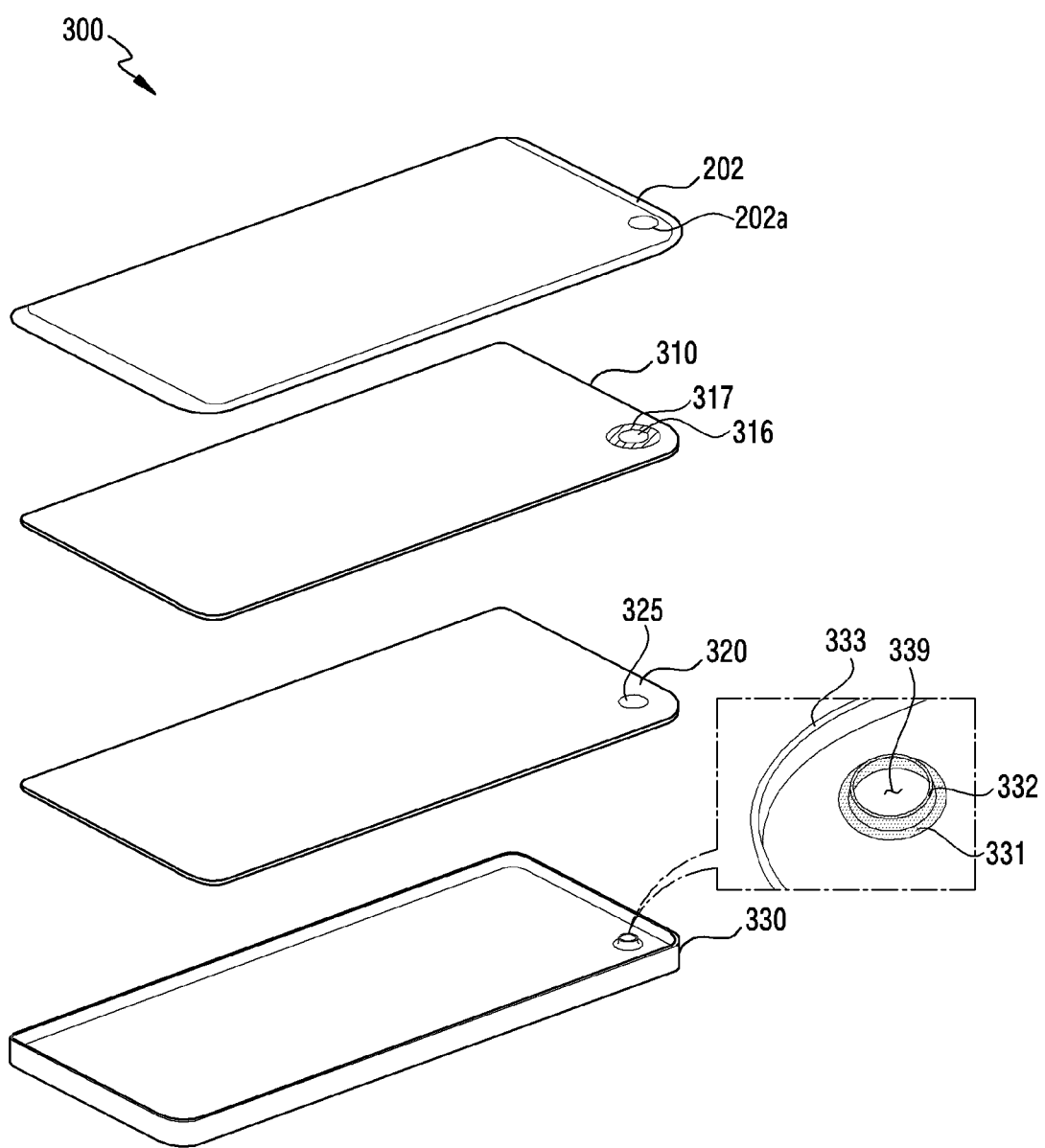
FIG. 4 is an exploded perspective view of a display.

FIG. 4 is a view illustrating exploded view of a display.

Referring to FIG. 4, a display 300 may include a front plate 202 (e.g., window), display panel 310 (e.g., LCD panel), a backlight module 320, and an inner housing 330 (e.g., display steel use stainless (SUS) plate).

According to various embodiments, the front plate 202 may form one surface of the electronic device 200 (e.g., the electronic device 200 of FIG. 2) and may be formed of a transparent material. The front plate may be formed of a polymer material such as a polyimide (PI), PET, or the like, or a glass material. The front plate may transmit the light emitted from the display panel 310 to the outside of the electronic device 200. A user visually recognizes the light transmitted from the front plate 202 and thus can acquire the information transferred from the electronic device 200. The front plate 202 may include a hole area 202a through which an optical input/output device (e.g., camera or optical sensor) passes. The hole area 202a may be a passage through which the light emitted from the optical input/output device or the light transmitted to the optical input/output device can be received.

According to various embodiments, the inner housing 330 may include a seating surface 331 facing the front plate 202 and may form the inner space between the seating surface 331 and the front plate 202. The inner housing 330 may include a side surface 333 which guides the positions of the display panel 310 and the backlight module 320 along the edge of the metal seating surface 331. The inner housing 330 may include a hole 339 corresponding to an area at which the optical input/output device is disposed and a side wall 332 protruding from the seating surface 331 along the hole 339. The inner housing 330 may be formed of a metal material. For example, the inner housing 330 may be formed of a material such as stainless steel, iron, or aluminum. The inner housing 330 has a smooth surface so that the reflection may occur.

According to various embodiments, the backlight module 320 may be disposed at the inner housing 330, be formed of multiple layers, and include an opening 325 surrounding the side wall 332 around the hole 339. The backlight module 320 may include: a plurality of light sources (not illustrated); a light guide plate for guiding the light emitted from the light sources to be transmitted to the front surface; a reflection sheet for reflecting light to allow the light to be transmitted to the front surface; and a diffusion sheet and a prism sheet for diffusing the transmitted light to allow the light to be evenly transmitted to the display panel. The light transmitted by the light guide plate and the reflection sheet may be transmitted to the display panel 310 including a liquid crystal.

According to various embodiments, the display panel 310 may be disposed between the backlight module 320 and the front plate 202. The display panel 310 may include a liquid crystal, a color filter, a vertical polarization filter, or a horizontal polarization filter. The display panel 310 may adjust color, brightness or the like of the light transmitted from the backlight module 320 to transmit the light to the outside through the front plate. According to various embodiments, the display panel 310 may include an opening 316, in which the color filter, the liquid crystal, and the polarization filter are not arranged, in the area in which the optical input/output device is disposed. Further, the display panel may include a black-processed black matrix (BM) 317 along the boundary of the opening 316.

A side wall 332 provided along the hole 339 of the inner housing 330 may have a surface facing the edge of the backlight module 320 and a surface facing the edge of the optical input/output device, all of which are black-processed (e.g., black-coating, black-painting, black application, or low reflection coating).

Figure 5:
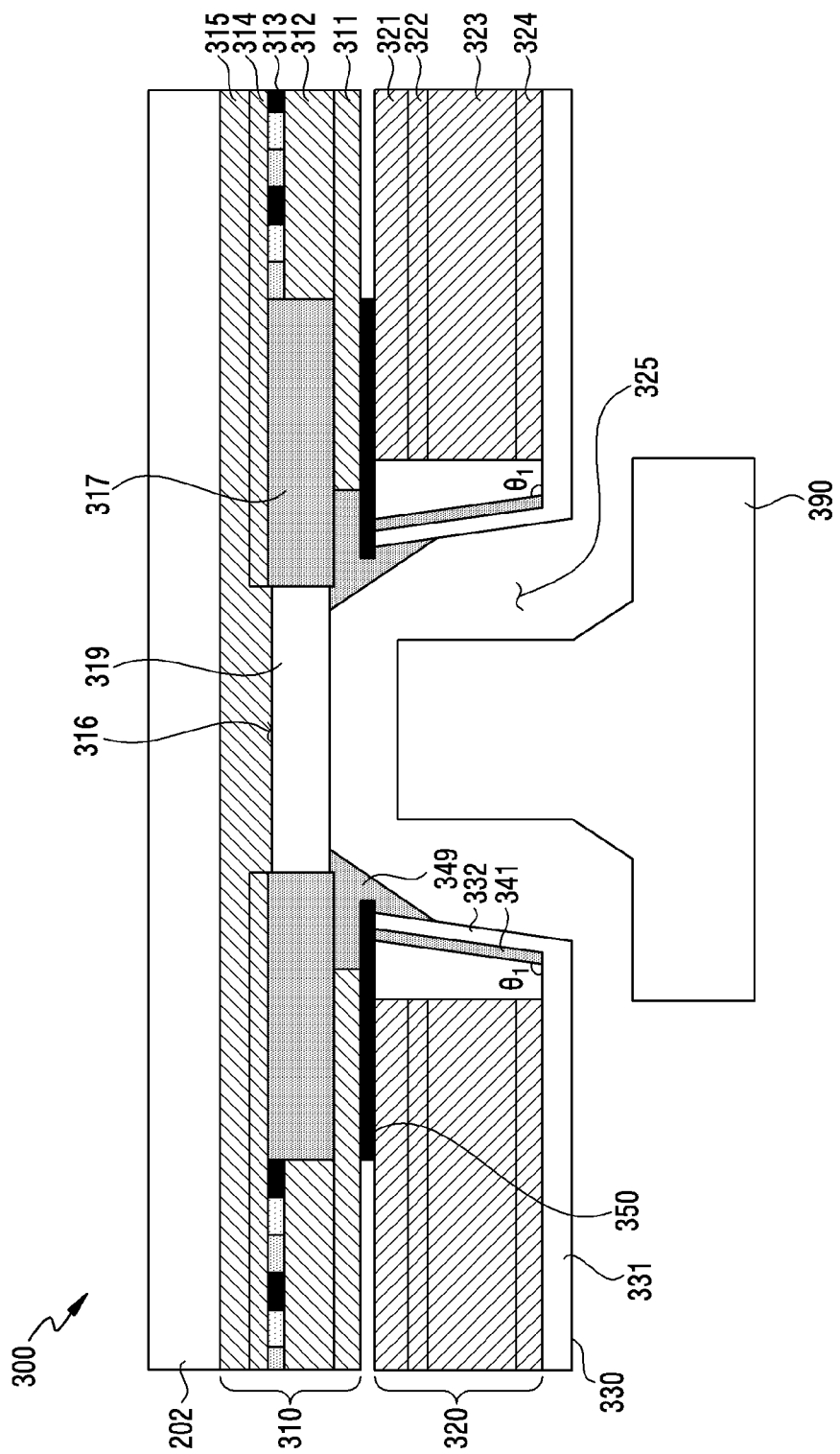
FIG. 5 is a view illustrating a stacked structure of a display according to various embodiments.
Figure 6:
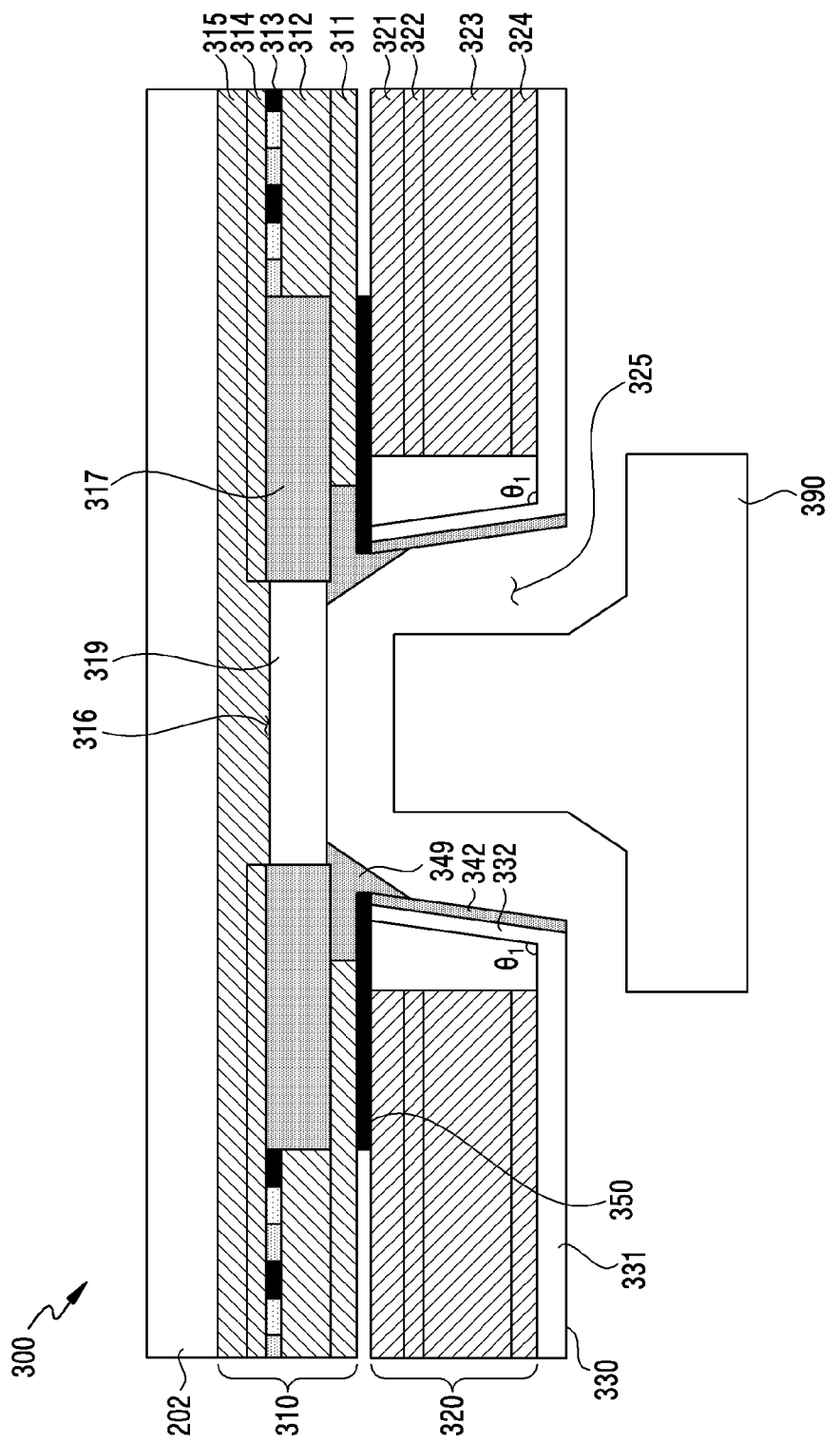
FIG. 6 illustrates another embodiment of black-processing a side surface of a hole in a display structure of FIG. 5 according to various embodiments.
Figure 7:
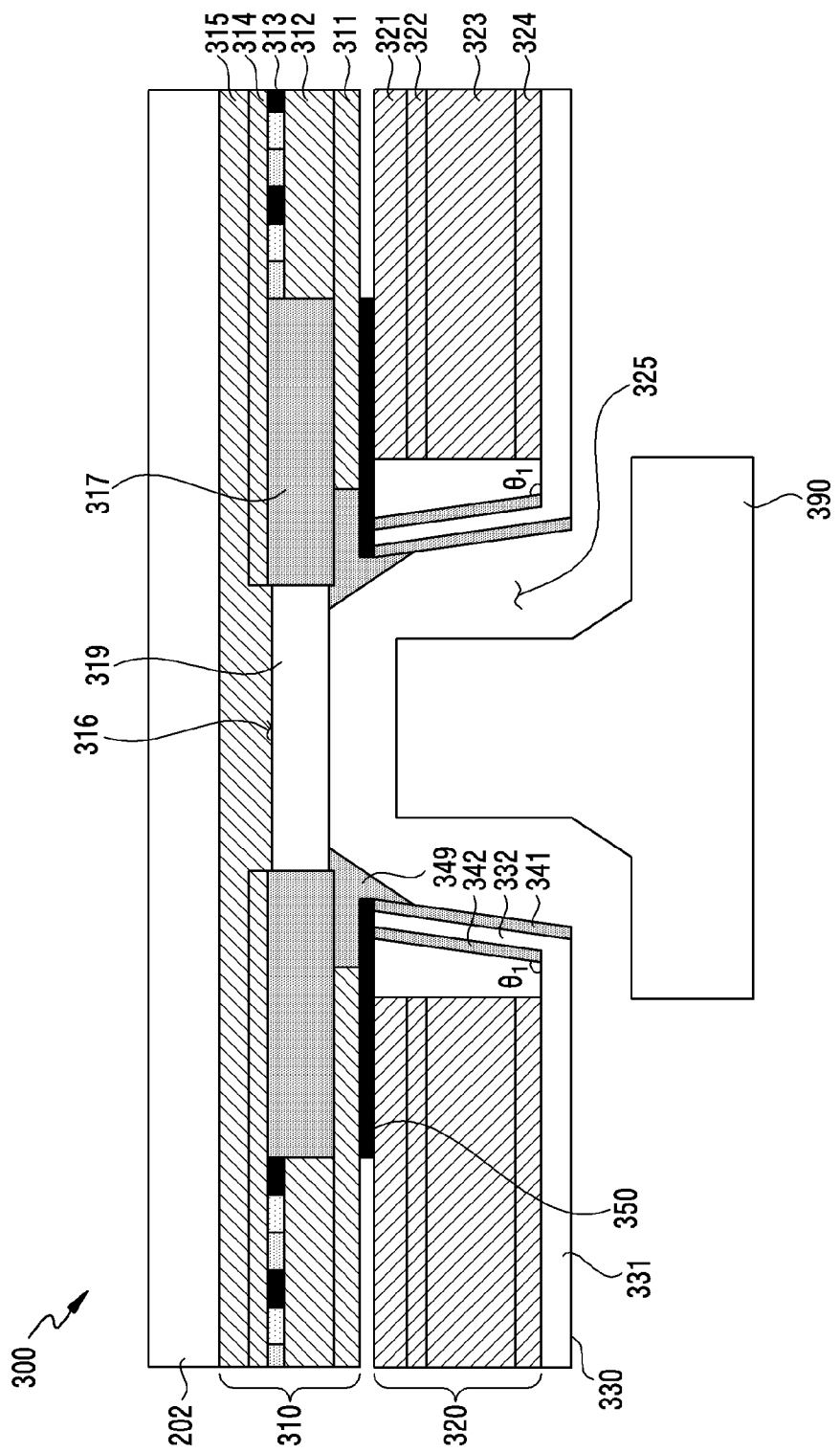
FIG. 7 illustrates that entire side surfaces of a hole are black-processed in a display structure of FIG. 5 according to various embodiments.

FIG. 5 is a view illustrating a stacked structure of a display according to various embodiments. FIG. 6 illustrates another embodiment of black-processing a side surface of a hole in a display structure of FIG. 5 according to various embodiments. FIG. 7 illustrates that entire side surfaces of a hole are black-processed in a display structure of FIG. 5 according to various embodiments.

According to various embodiments, the display 300 may include the backlight module 320 including an opening 325 provided along an optical input/output device 390 (e.g., camera, illuminance sensor, proximity sensor, IR sensor, and ToF image sensor), the inner housing 330 surrounding the backlight module 320, display panel 310 disposed on the backlight module 320, and the front plate 202 disposed on the display panel.

According to various embodiments, at least a part of the optical input/output device 390 is disposed under the display 300, and thus can be disposed in an active area in which pixels of the display 300 are arranged to form a screen. Some layers of the display 300 may include a first opening 325 and may include an inactive area 319 in which the color filter is not disposed. The inactive area 319 in which the color filter is not arranged and the first opening 325 may be a passage through which the light emitted from the optical input/output device 390 or the light received in the optical input/output device 390.

According to various embodiments, the backlight module 320 may include a reflection sheet 324 disposed on the inner housing 330, a light guide plate 323 disposed on the reflection sheet 324, a diffusion sheet 322 disposed on the light guide plate 323, and a prism sheet 321 disposed on the diffusion sheet 322. The backlight module 320 may be supported by the inner housing 330 and may be disposed to be spaced apart from the side surface of the inner housing. The backlight module 320 may be spaced apart from the side surface of the inner housing 330 by a designated distance to prevent the damage of the backlight module 320.

According to various embodiments, the light guide plate 323 may transmit the light emitted from the light source included in the backlight module 320. The light guide plate corresponds to a passage transmitting light, and the light guide plate 323 may transmit the light transmitted from the light source to the display panel 310 or to the reflection sheet 324.

The reflection sheet 324 may reflect the light transmitted through the light guide plate 323. The light reflected by the reflection sheet 324 may be transmitted to the display panel 310 including a liquid crystal. The light reflected by the reflection sheet 324 may be transmitted to the display panel 310 through the prism sheet 321 or the diffusion sheet 322 which is disposed between the display panel 310 and the light guide plate 323. The diffusion sheet 322 may diffuse the light transmitted through the light guide plate 323 to evenly translate the light to the display panel 310. The prism sheet 321 may direct the light transmitted through the light guide plate 323 toward the display panel 310 or the front plate 202.

According to various embodiment, a display 310 may include a first polarization layer 311, a liquid crystal layer 312, a color filter 313, and a second polarization layer 314.

According to various embodiments, the first polarization layer 311 may allow white light emitted from the backlight module 320 to include only a wavelength of a first direction (e.g., vertical direction).

The liquid crystal layer 312 may have liquid and solid properties, and each of the liquid crystal may function as a shutter for passing or shielding light. The arrangement of the liquid crystal to which a voltage is applied may be changed. The liquid crystal layer 312 may include a thin film transistor (TFT) layer for applying a voltage. The TFT layer may be a switch for applying a voltage to the liquid crystal.

According to various embodiments, the color filter 313 may form a color for an image transferred to a user. The color filter 313 may be provided as red, green, and blue (R/GB) filters or red, green, blue, and white (R/G/B/W) filters, and each of the color filters may be one sub pixel. The color filter may be formed of a plurality of pixels, and the number of the TFT may be equal to the number of the plurality of pixels.

According to various embodiments, the second polarization layer 314 may pass only the light having a wavelength of a second direction (e.g., horizontal polarization light) perpendicular to the first direction among the light emitted from the liquid crystal. The light passed through the second polarization layer 314 may implement an image. The phase of the light passed through the first polarization layer 311 may change while passing through the liquid crystal, and the changed light may pass through the second polarization layer 314. The light passed through the second polarization layer 314 may pass through the front plate and transferred to a user. The second polarization layer may include an adhesive layer 315 formed thereon and formed of an optical clear adhesive (OCA), an optical adhesive film, or an optical clear resin (OCR). According to various embodiments, the first polarization layer 311 and the second polarization layer 314 may transmit circularly polarized light or linearly polarized light, in addition to the above described horizontally or vertically polarized light. According to various embodiments, the first polarization layer 311 and the second polarization layer 314 may have various polarization directions according to design, manufacture, or performance.

According to various embodiments, the display 300 may include the first opening 325 provided at the backlight module 320 and the opening 316 provided at the display panel 310 to allow the light emitted from the optical input/output device 390 or the light received in the optical input/output device 390 to pass therethrough. In the display panel 310, the liquid crystal layer 312 and the color filter 313 may have the inactive area 319 in which the liquid crystal layer 312 and the color filter 313 are removed and which is disposed at the area corresponding to the opening 316. In the display panel, the liquid crystal layer 312 and the color filter 313 may include the black matrix 317 provided around the inactive area 319 in which a transparent panel is disposed. The black matrix 317 may prevent a display wire or the like from being visible from the outside and may prevent the light emitted from the display 300 from propagating toward the optical input/output device 390.

According to various embodiments, a light shielding layer 350 may be included between the display panel 310 and the backlight module 320. According to various embodiments, the light shielding layer 350 may include a light shielding tape or a black-coated layer. The first polarization layer 311 may include a black resin 349 provided along the peripheral area of the opening 316. The resin 349 may be disposed to be in contact with the light shielding layer 350, and is configured to fix the inner housing 330 and the display panel 310. The light shielding layer 350 and the resin 349 may prevent a leak of light emitted from a back light (hole light leak).

According to various embodiments, an angle θ1 between the side wall 332 and the seating surface 331 is between 80 degrees and 100 degrees and may be determined in consideration of light leak prevention, ease of a process for producing an inner housing, or the like.

According to various embodiments, the side wall 332 of the inner housing 330 may have a black-processed surface facing the edge of the backlight module 320 or a black-processed surface facing the edge of the optical input/output device. According to various embodiments, the black-processing may include application or coating of black series, achromatic series, or various low-reflection colors.

Referring to FIG. 5, a first coating layer 341 may be provided at a surface facing the edge of the backlight module 320 in the side wall 332. The first coating layer 341 may prevent the light emitted from the backlight module 320 from being transmitted to the outside through the area in which the light shielding layer 350 is not disposed. When the light is transmitted to the outside, the peripheral portion of a hole may look bright (hole light leakage).

Referring to FIG. 6, the second coating layer 342 may be provided at the surface facing the optical input/output device 390 in the side wall 332 of the inner housing 330. The second coating layer 342 may prevent the light leaked through the gaps in the light shielding tape 350 or the resin 349 from being reflected to the surface facing the optical input/output device 390 in the side wall 332 and being transmitted to the outside.

Referring to FIG. 7, the first coating layer 341 and the second coating layer 342 may be arranged at both opposite surfaces of the side wall 332 of the inner housing 330. According to various embodiments, the first coating layer 341 and the second coating layer 342 may be formed of a layer having low reflectivity, may include black coating layer, and may be applied with a black series color.

According to various embodiments, the surfaces of the side wall 332 of the inner housing 330 may be black-processed without using the first coating layer 341 and the second coating layer 342. According to various embodiments, the thicknesses of the first coating layer 341 and the second coating layer 342 may be different, for example, the first coating layer 341 may be processed to be thick to effectively reduce the hole light leak due to the light directly transmitted from the backlight module 320 and the second coating layer 342 may be processed to be thin to secure the width of the opening 325.

Figure 8:
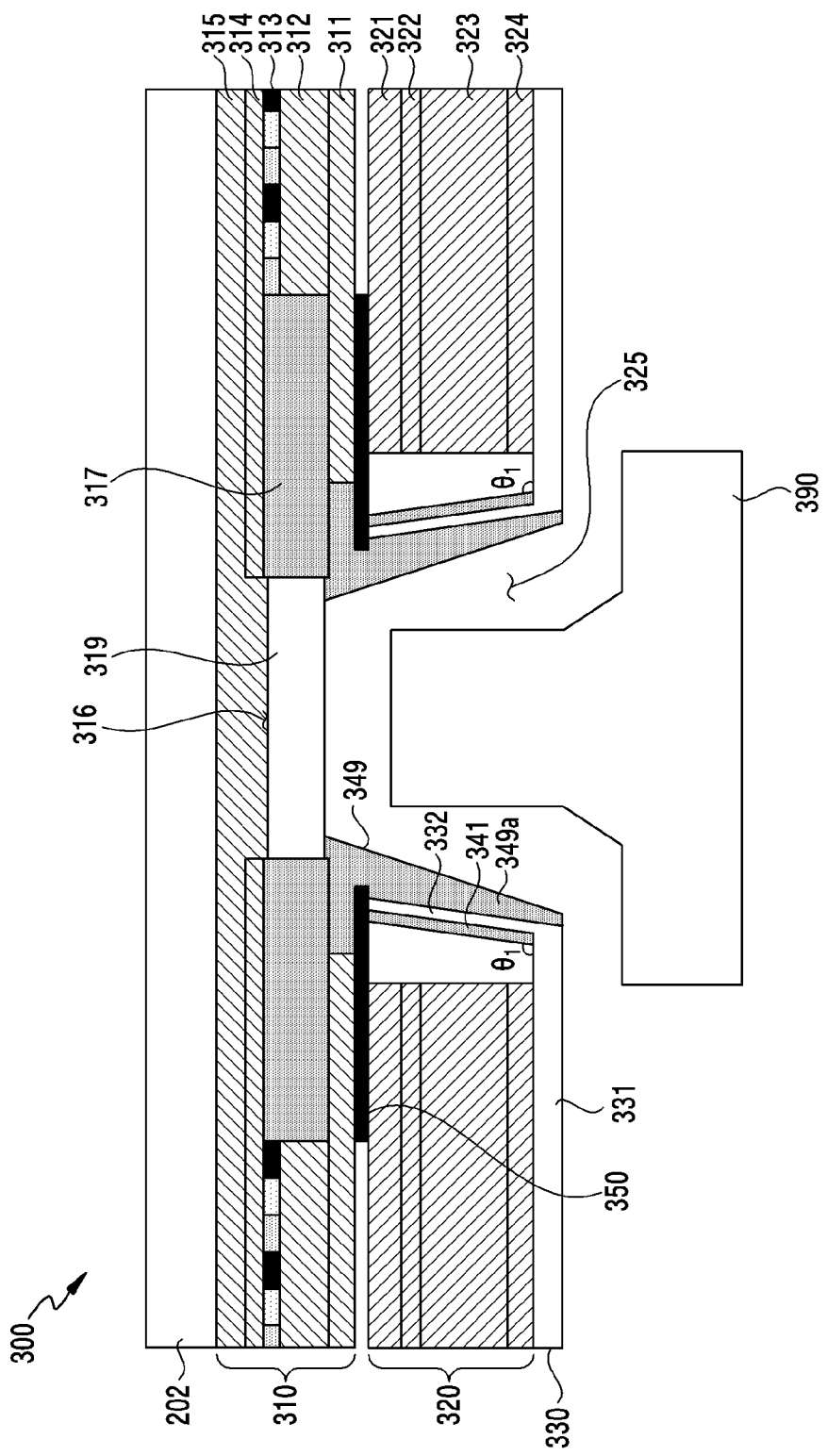
FIG. 8 illustrates an example in which a black resin is modified in a display structure of FIG. 5 according to various embodiments.

FIG. 8 illustrates an example in which a black resin 349 is modified in a display structure of FIG. 5 according to various embodiments.

Referring to FIG. 8, the shape of the black resin 349 is modified to replace or overlap the second coating layer 342 of FIG. 7, and the modified black resin 349 may prevent light from being reflected from the surface facing the optical input/output device 390 in the side wall 332 of the inner housing 330.

According to various embodiments, the black resin 349 may include an extension part 349a disposed along the surface facing the optical input/output device 390 in the side wall 332 of the inner housing 330. The extension part 349a of the black resin 349 may cover the surface facing the optical input/output device 390 in the side wall 332 of the extension part 349a. The extension part 349a may prevent the light leaked through the gaps in the black resin 349 or the light shielding layer 350 from being reflected from the surface facing the optical input/output device 390 in the side wall 332.

Figure 9:
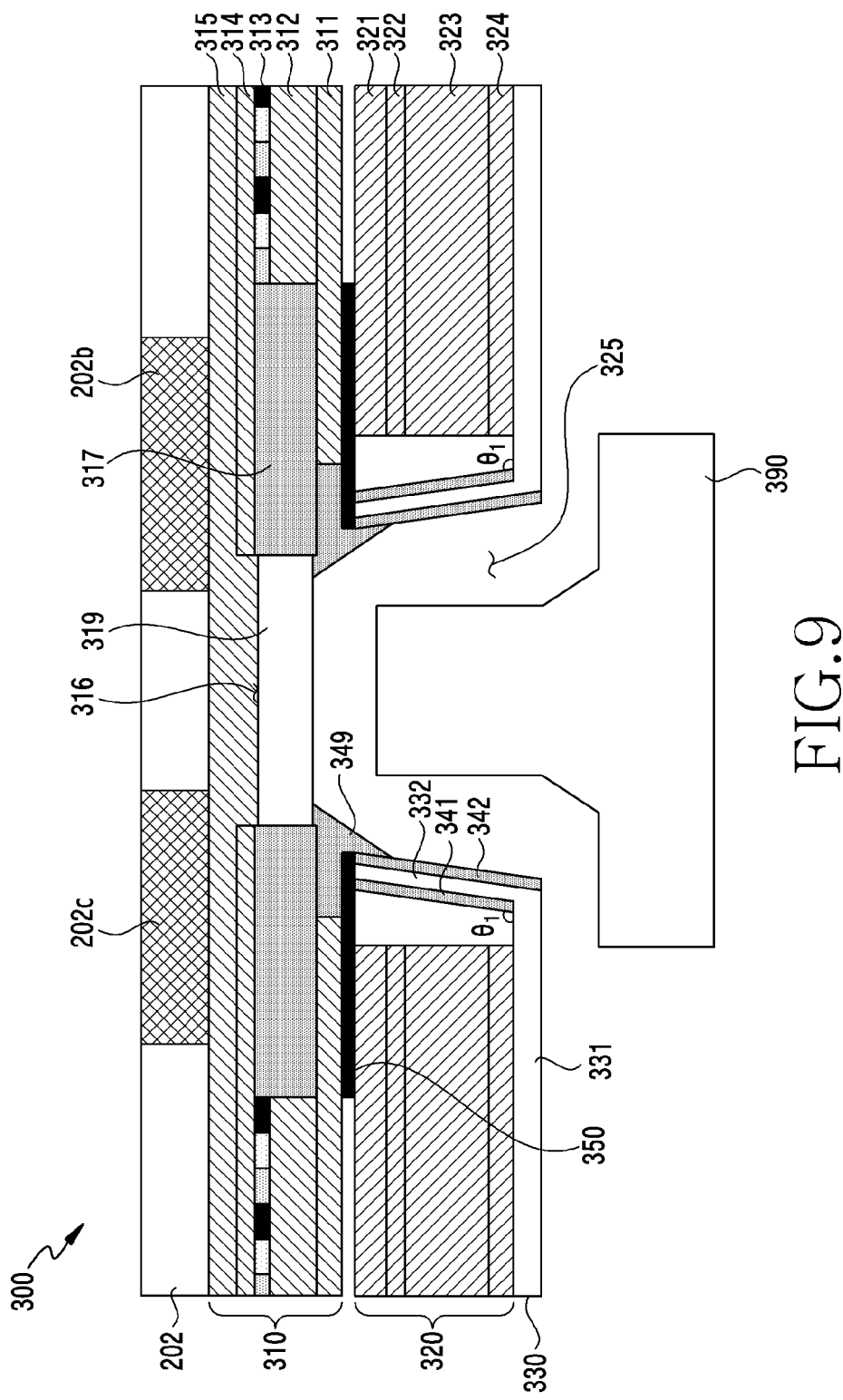
FIG. 9 illustrates a window including a window black matrix in a display structure of FIG. 7.
Figure 10:
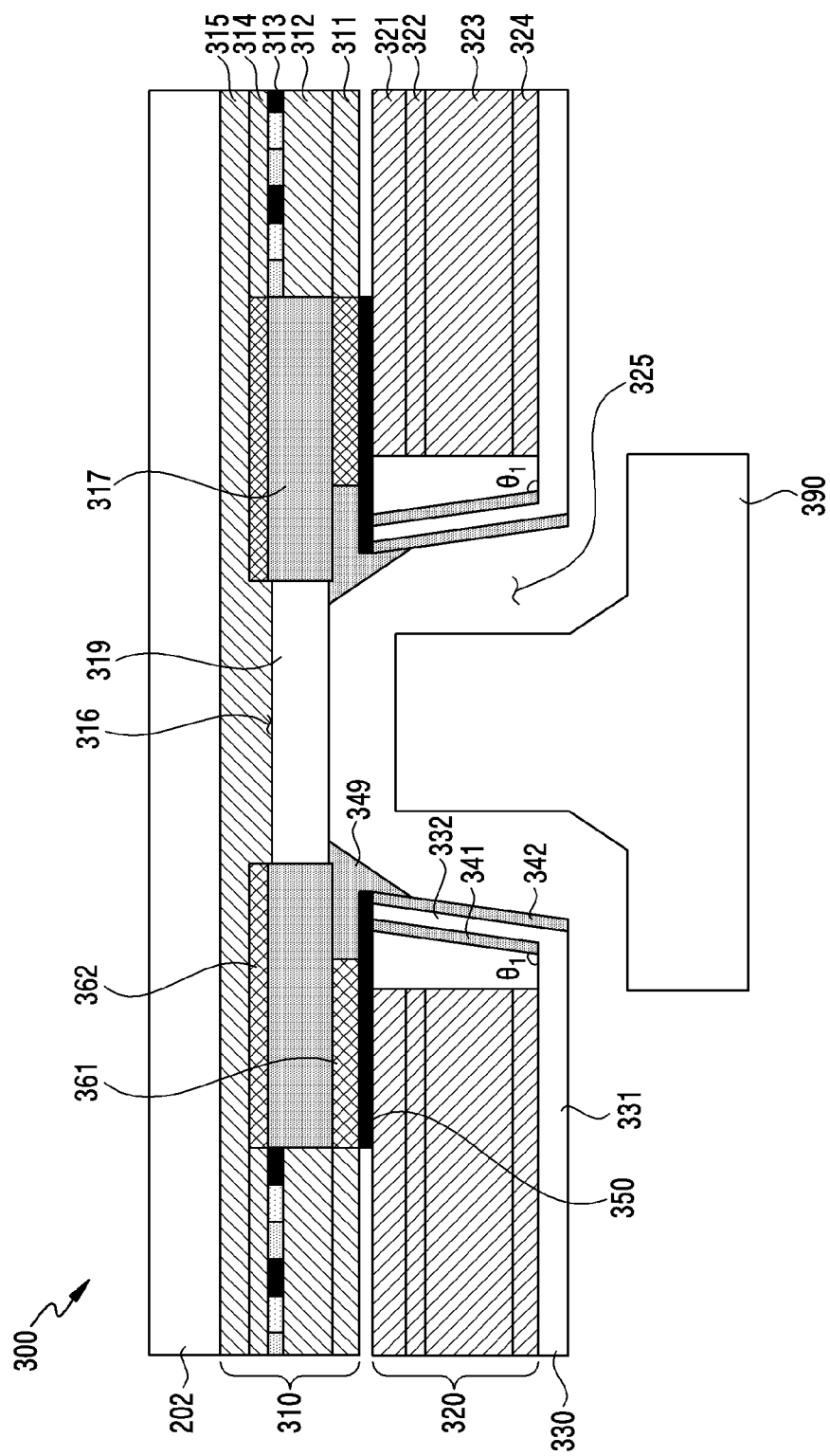
FIG. 10 illustrates a polarization layer black-processed in a display structure of FIG. 7.
Figure 11:
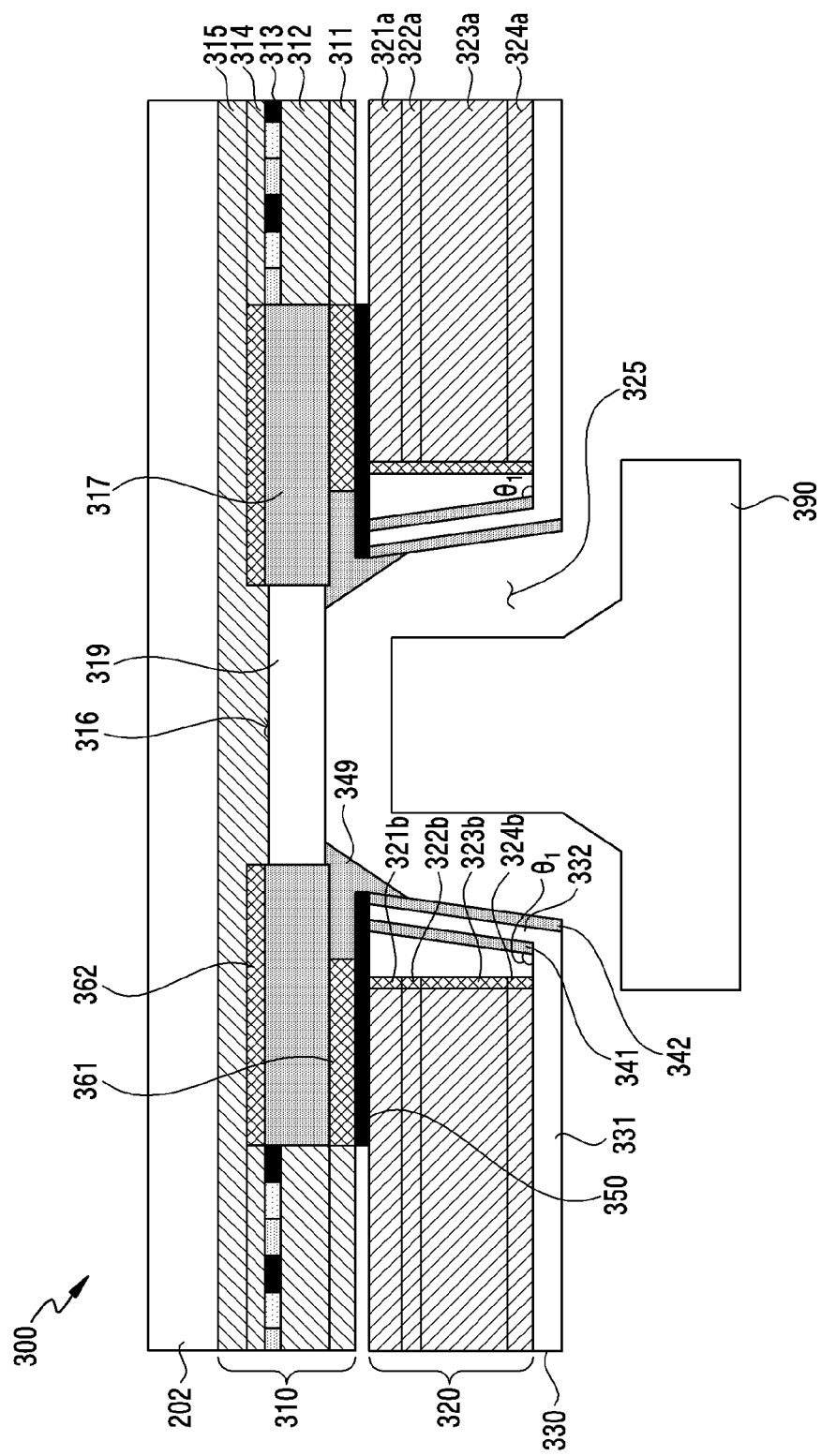
FIG. 11 illustrates that edges of multiple layers forming a backlight module are black-processed in a display structure of FIG. 10.

FIG. 9 illustrates a window including a window black matrix in the display 300 of FIG. 7. FIG. 10 illustrates a polarization layer black-processed in the display 300 of FIG. 7. FIG. 11 illustrates that edges of multiple layers forming a backlight unit are black-processed in the display 300 of FIG. 10.

Referring to FIG. 9 to FIG. 11, the display 300 may prevent the hole light leak by various black-processing around the openings 316 and 325 formed around the optical input/output device 390.

Referring to FIG. 9, the front plate 202 (or window) may include a window black matrix (BM). The window black matrix 202b and 202c may be provided along the edge of the opening 316, and the size of the black matrix 202b and 202c may be determined in consideration of assembly tolerance or the like of the optical input device 390.

In the display structure FIGS. 5, 6, 8, 10, 11, and 12, the window black matrix 202b and 202c may be added.

According to various embodiments, in the display 300 of FIG. 5, the first coating layer 341 may be provided at the surface facing the edge of the backlight module 320 in the side wall 332 of the inner housing 330. In the display 300 of FIG. 6, the second coating layer 342 may be provided at the surface facing the optical input/output device 390 in the side wall 332 of the inner housing 330. As in the display 300 of FIG. 5 and FIG. 6, even when including at least one of the first coating layer 341 or the second coating layer 342, the window 202 may include the window black matrix 202b and 202c provided along the edge of the opening 316.

According to various embodiments, as in FIG. 8, the second coating layer 342 may be replaced with the extension part 349a of the black resin 349, which extends along the surface facing the optical input/output device 390 in the side wall 332 of the inner housing 330.

Referring to FIG. 10, at least one of the first polarization layer 311 and the second polarization layer 314 may be partially black-processed. The first polarization layer 311 may be black-processed in an area 361 corresponding to the panel black matrix 317. The black-processed area 361 of the first polarization layer 311 may be provided from one end of the resin 349 along the edge of the opening.

The second polarization layer may be black-processed in an area 362 corresponding to the panel black matrix 317. The second polarization layer 314 may be provided along the edge of the opening 316.

In the display structure of FIGS. 5, 6, 7, 8, 9, 11, and 12, at least one of the first polarization layer 311 and the second polarization layer 314 including the black-processed area provided along the edge of the opening may be applied thereto. According to various embodiments, as in the display 300 of FIG. 5 and FIG. 6, even when including at least one of the first coating layer 341 or the second coating layer 342, at least one of the first polarization layer 311 and the second polarization layer 314 may include the black-processed area provided along the edge of the opening 325.

According to various embodiments, as in FIG. 8, the second coating layer 342 may be replaced with the extension part 349a of the black resin 349, which extends along the surface facing the optical input/output device 390 in the side wall 332 of the inner housing 330.

According to various embodiments, as in FIG. 9, the window 202 may include the window black matrix 202b and 202c provided along the edge of the opening 316.

Referring to FIG. 11, in the display 300 of FIG. 10, the edges of the layers forming the backlight module 320 may be black-processed. According to various embodiments, the backlight module 320 may include a reflection sheet 324a disposed on the inner housing 330, a light guide plate 323a disposed on the reflection sheet 324a, a diffusion sheet 322a disposed on the light guide plate 323a, and a prism sheet 321a disposed on the diffusion sheet 322a. the backlight module 320 may be supported by the inner housing 330 and may be disposed to be spaced apart from the side surface of the inner housing 330. According to various embodiments, the edge area 321b of the prism sheet 321a, which faces the first coating layer 341, may be black-processed. The edge area 322b of the diffusion sheet 322a, which faces the first coating layer 341, may be black-processed. The edge area 323b of the light guide plate 323a, which faces the first coating layer 341, may be black-processed. The edge area 324b of the reflection sheet 324a, which faces the first coating layer 341, may be black-processed. The reflection sheet 324a, the light guide plate 323a, the diffusion sheet 322a, and the prism sheet 321a may be stacked one another to provide continuous black-processed area. The black-processed area 321b, 322b, 323b, and 324b may prevent light from being transmitted from the backlight module 320 to the side wall of the inner housing 330.

In the display structure of FIGS. 5, 6, 7, 8, 9, 10, 11, and 12, the black-processed area 321b, 322b, 323b, and 324b may be applied thereto. According to various embodiments, as in the display 300 of FIG. 5, FIG. 6, and FIG. 7, at least one of the first coating layer 341 or the second coating layer 342 may be included, and, even when the first polarization layer 311 and the second polarization layer 314 are not black-processed, the black-processed area 321*b*, 322*b*, 323*b*, and 324*b* of the backlight module 320 may be included.

According to various embodiments, as in FIG. 8, the second coating layer 342 may be replaced with the extension part 349*a* of the black resin 349, which extends along the surface facing the optical input/output device 390 in the side wall 332 of the inner housing 330.

According to various embodiments, as in FIG. 9, the window 202 may include the window black matrix 202*b* and 202*c* provided along the edge of the opening 316.

Figure 12:
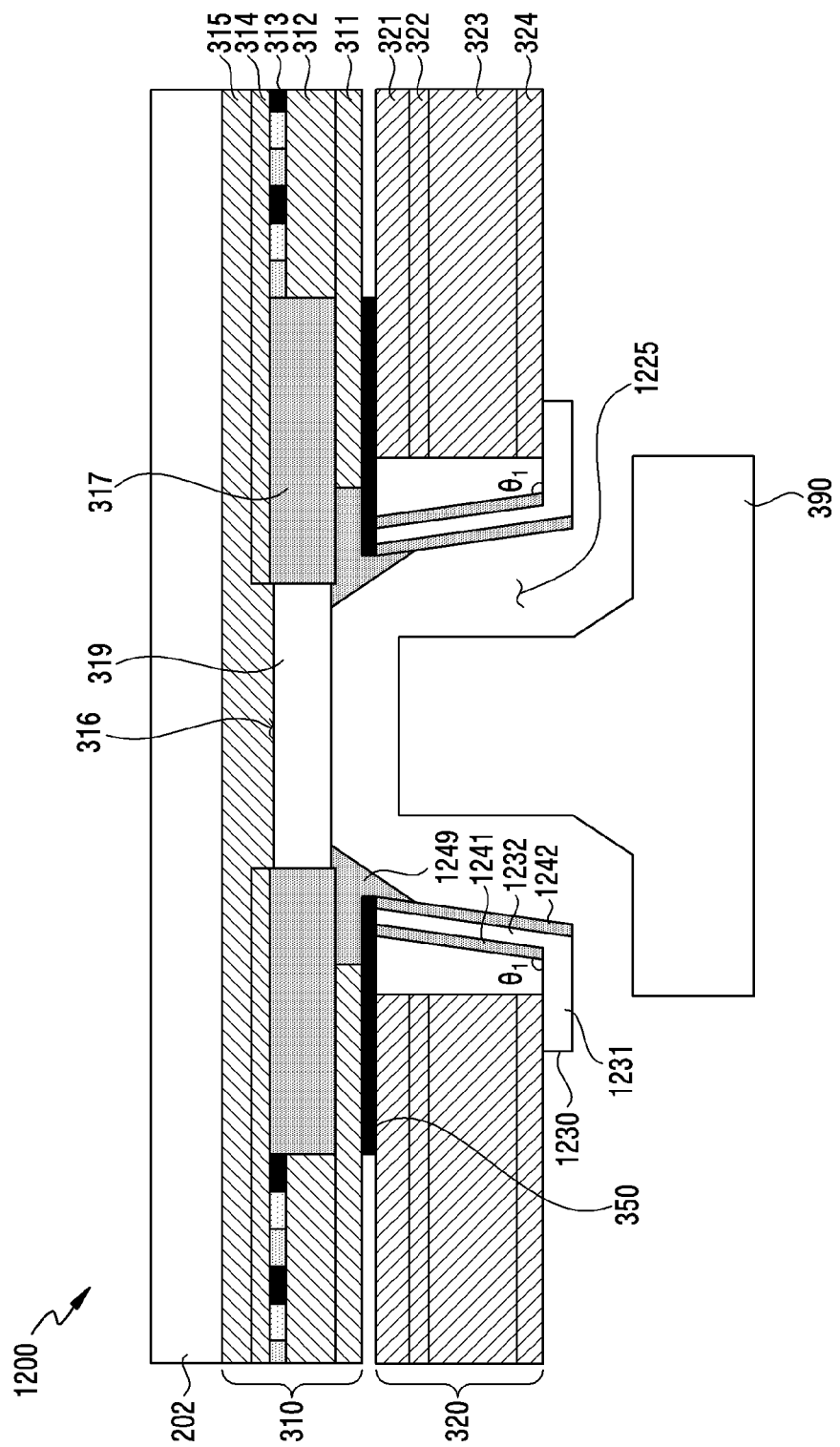
FIG. 12 illustrates that an inner housing is replaced with a mold in a display of FIG. 7.

FIG. 12 illustrates an embodiment of adding a mold 1230 instead of including the inner housing in the display of FIG. 7.

According to various embodiments, the mold 1230 may include a seating part 1231 and a side wall 1232 on which the backlight module 320 is seated. The seating part 1231 is provided only around the hole so that the weight and the thickness of a display 201 may be reduced. The side wall 1232 may extend from the edge of the seating part 1231 toward the front plate 202. The seating part 1231 may be in contact with a portion of the reflection sheet 324 of the backlight module 320. The mold 1230 may be formed by injection molding with a support member (e.g., bracket) of the electronic device 1200.

Referring to FIG. 12, in the electronic device 1200, at least one of a first coating layer 1241 provided at the surface facing the backlight module 320 in the side wall of the inner housing or a second coating layer 1242 provided at the surface facing the side wall 1232 of the mold 1230 may be disposed. According to various embodiments, the first coating layer 1241 and the second coating layer 1242 may be formed of a layer having low reflectivity and may include black coating layer.

According to an embodiment, the first coating layer may be thicker than the second coating layer 1242. According to an embodiment, one of the first coating layer 1241 and the second coating layer 1242 may be omitted. According to an embodiment, a resin 1249 may be modified as the resin 349 of FIG. 8 and may replace or overlap the second coating layer 1242.

According to various embodiments, as in FIG. 9, the window 202 may include the window black matrix 202*b* and 202*c* provided along the edge of the opening 316.

According to various embodiments, as in FIG. 10, the first polarization layer 311 and the second polarization layer 314 may be black-processed in an area corresponding to the panel black matrix 317. As in FIG. 11, the layers of the backlight module 320 may be black-processed at the surface facing the side wall 1232.

According to various embodiments, the electronic device (e.g., the electronic device 200 of FIG. 2) may include a housing (e.g., the housing 210 of FIG. 2), an optical input/output device (e.g., the optical input/output device 390 of FIG. 5) disposed in the housing, an inner housing (e.g., the inner housing 330 of FIG. 4) disposed in the housing and including a seating surface (e.g., the seating surface 331 of FIG. 4), a hole (e.g., the hole 339 of FIG. 4) provided at the seating area corresponding to the optical input/output device, and a side wall protruding from the seating surface 331 along the hole, a backlight module (e.g., the backlight module 320 of FIG. 5) disposed on the seating surface, formed of multiple layers (e.g., the prism sheet 321, the diffusion sheet 322, the light guide plate 323, or the reflection sheet 324 of FIG. 5), and including a first opening (the opening 325 of FIG. 5) surrounding the hole of the seating surface, a display panel (e.g., the display panel 310 of FIG. 5) disposed on the backlight module and including a first area corresponding to the hole and a second area which surrounds the first area and in which an active area is positioned, and a transparent plate (e.g., the transparent plate 202 of FIG. 5) disposed on the display panel, wherein the side wall may include a first side surface facing the backlight and a second side surface facing the optical input/output device and the first side surface may be black-processed.

According to various embodiments, the second side surface may be black-processed.

According to various embodiments, a black layer (e.g., the first coating layer 341 of FIG. 7) provided at the first side surface may be thicker than a black layer (e.g., the second coating layer 342 of FIG. 7) provided at the second side surface.

According to various embodiments, a black resin (e.g., the resin 349 of FIG. 5) disposed between the display panel and the side wall and extending along the second side surface may be included.

According to various embodiments, the side wall may be formed to have an inclination in a range of 70 degrees to 110 degrees with respect to the seating surface.

According to various embodiments, the display panel may include a first polarization layer (e.g., the first polarization layer 311 of FIG. 5) forming a surface facing the window or transparent plate and a second polarization layer (e.g., the second polarization layer 314 of FIG. 5) forming a surface facing the backlight.

According to various embodiments, a hole (e.g., the opening 316 of FIG. 5) corresponding to the first area extends through the first polarization layer and the second polarization layer.

According to various embodiments, surfaces of the first polarization layer and the second polarization layer along the hole may be black-processed.

According to various embodiments, the backlight may include a light source and the multiple layers may transmit the light emitted from the light source to the display panel.

According to various embodiments, a hole spaced apart from the first opening of the inner housing extends through the multiple layers and each surface of the multiple layers along the hole may be black-processed.

A display according to various embodiments (e.g., the display 300 of FIG. 5) may include: a window (e.g., the window 202 of FIG. 5); a display panel (e.g., the display panel 310) including a hole through which the light emitted or transmitted from a sensor (e.g., the optical input/output device 390 of FIG. 5) disposed under the display can pass; an inner housing (e.g., the inner housing 330 of FIG. 5) including a side wall (e.g., the side surface 333 of FIG. 5) provided along the edge of the window, a seating surface (e.g., the seating surface 331 of FIG. 5) extending from the side wall, a hole (e.g., the hole 339 of FIG. 4) provided at the area corresponding to the sensor of the seating surface, and a hole side wall (e.g., the side wall 332 of FIG. 5 extending from the seating surface along an edge of along the hole; and a backlight module (e.g., the backlight module 320 of FIG. 5) disposed on the seating surface, formed of multiple layers (e.g., the prism sheet 321, the diffusion sheet 322, the light guide plate 323, and the reflection sheet 324 of FIG. 5), and including a first opening (e.g., the opening 325 of FIG. 5) surrounding the hole side wall of the seating surface, wherein the hole side wall may include a first side surface facing the backlight and a second side surface facing the side surface of the sensor and the first side surface may be black-processed.

According to various embodiments, the second side surface may be black-processed.

According to various embodiments, a black layer (e.g., the first coating layer 341 of FIG. 7) provided at the first side surface may be thicker than a black layer (e.g., the second coating layer 342 of FIG. 7) provided at the second side surface.

According to various embodiments, the display panel may include a first polarization layer (e.g., the first polarization layer 311 of FIG. 5) forming the surface facing the window and a second polarization layer (e.g., the second polarization layer 314 of FIG. 5) forming the surface facing the backlight.

According to various embodiments, a hole (e.g., the opening 316 of FIG. 5) corresponding to the first area extends through the first polarization layer and the second polarization layer.

According to various embodiments, surfaces of the first polarization layer and the second polarization may be black-processed along the edge of the hole.

According to various embodiments, the backlight may include a light source and the multiple layers may transmit the light emitted from the light source to the display panel.

According to various embodiments, a hole spaced apart from the first opening of the inner housing extends through the multiple layers and each surface of the multiple layers along the hole may be black-processed.

According to various embodiments, the first side surface of the hole side wall may have black coating formed therein and the coating may be formed of ink or resin.

According to various embodiments, the electronic device (e.g., the electronic device 200 of FIG. 2) may include: a housing (e.g., the housing 210 of FIG. 2); an optical input/output device (e.g., the optical input/output device 390 of FIG. 5) disposed in the housing; a backlight module (e.g., the backlight module 320 of FIG. 5) disposed on the seating surface, formed of multiple layers (e.g., the prism sheet 321, the diffusion sheet 322, the light guide plate 323, or the reflection sheet 324 of FIG. 5), and including a first opening (e.g., the opening 325 of FIG. 5) surrounding the optical input/output device while being spaced apart therefrom; a display panel (e.g., the display panel 310 of FIG. 5) disposed on the backlight module and including a first area corresponding to the first opening and a second area which surrounds the first area and in which an active area is positioned; a transparent plate (e.g., the transparent plate 202 of FIG. 5) disposed on the display panel; and a mold (e.g., the mold 1230 of FIG. 12) including a seating surface (e.g., the seating part 1231 of FIG. 12) for supporting the backlight, a hole provided at the area corresponding to the optical input/output device, and a side wall (e.g., the side wall 1232 of FIG. 12) provided along the hole, wherein the side wall may include a first side surface facing the backlight and a second side surface facing the optical input/output device and the first side surface may be black-processed.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

What is claimed is:

1. An electronic device comprising:
a housing;
an optical input/output device disposed in the housing;
an inner housing disposed in the housing and comprising:
   a seating surface that includes a hole to accommodate the optical input/output device, and
   a side wall protruding from the seating surface along the hole;
a backlight module disposed on the seating surface, formed of multiple layers, and comprising a first opening surrounding the side wall;
a display panel disposed on the backlight module and comprising a first area corresponding to the hole and a second area which surrounds the first area and in which an active area is positioned; and
a transparent plate disposed on the display panel,
wherein the side wall comprises a first side surface facing the backlight module and is black-processed, and
wherein the side wall includes an inclined surface forming an angle of inclination with respect to the seating surface.

2. The electronic device of claim 1, wherein:
the side wall comprises a second side surface facing the optical input/output device, and
the second side surface is black-processed.

3. The electronic device of claim 2, wherein a black layer provided on the first side surface is thicker than a black layer provided on the second side surface.

4. The electronic device of claim 2, further comprising a black resin disposed between the display panel and the side wall and extending along the second side surface.

5. The electronic device of claim 1, wherein the side wall is formed to have an inclination in a range from 70 degrees to 110 degrees with respect to the seating surface.

6. The electronic device of claim 1, wherein the display panel comprises:
 a first polarization layer forming a surface facing the transparent plate, and
 a second polarization layer forming a surface facing the backlight module.

7. The electronic device of claim 6, wherein a hole corresponding to the first area extends through the first polarization layer and the second polarization layer.

8. The electronic device of claim 7, wherein surfaces of the first polarization layer and the second polarization layer along the hole are black-processed.

9. The electronic device of claim 1, wherein:
 the backlight module comprises a light source,
 the multiple layers transmit light emitted from the light source to the display panel,
 a hole spaced apart from the first opening of the inner housing extends through the multiple layers, and
 each surface of the multiple layers along the hole is black-processed.

10. The electronic device of claim 9, wherein the first side surface of the side wall has a black-type coating formed of ink or resin.

11. A display comprising:
 a window;
 a display panel in contact with one surface of the window and comprises a hole through which a light emitted or transmitted from a sensor disposed under the display can pass;
 an inner housing comprising:
  a side surface provided along an edge of the window,
  a seating surface extending from the side surface, a hole provided in an area of the seating surface, which corresponds to the sensor, and a hole side wall extending from the seating surface along an edge of the hole; and
 a backlight module disposed on the seating surface, formed of multiple layers, and comprising a first opening surrounding the hole side wall of the seating surface,
 wherein the hole side wall comprises a first side surface facing the backlight module and is black-processed.

12. The display of claim 11, wherein:
 the hole side wall comprises a second side surface facing a side surface of the sensor, and
 the second side surface is black-processed.

13. The display of claim 12, wherein a black layer provided at the first side surface is thicker than a black layer provided at the second side surface.

14. The display of claim 12, further comprising a black resin disposed between the display panel and the side surface and extending along the second side surface.

15. The display of claim 11, wherein the side surface is formed to have an inclination in a range from 70 degrees to 110 degrees with respect to the seating surface.

16. The display of claim 11, further comprising:
 a first polarization layer forming a surface facing the window; and
 a second polarization layer forming a surface facing the backlight module.

17. The display of claim 16, wherein a hole corresponding to the area extends through the first polarization layer and the second polarization layer.

18. The display of claim 17, wherein surfaces of the polarization layer and the second polarization layer along the hole are black-processed.

19. The display of claim 11, wherein:
 the backlight module comprises a light source,
 the multiple layers transmit light emitted from the light source to the display panel,
 a hole spaced apart from the first opening of the inner housing, and
 each surface of the multiple layers along the hole is black-processed.

20. The display of claim 11, wherein the first side surface of the hole side wall has a black-type coating formed of ink or resin.

* * * * *